US009069186B2

(12) United States Patent
Pugh et al.

(10) Patent No.: US 9,069,186 B2
(45) Date of Patent: Jun. 30, 2015

(54) THERMOFORMED OPHTHALMIC INSERT DEVICES

(71) Applicant: Johnson & Johnson Vision Care, Inc., Jacksonville, FL (US)

(72) Inventors: Randall B. Pugh, Jacksonville, FL (US); Karson S. Putt, Jacksonville, FL (US); Edward R. Kernick, Jacksonville, FL (US); Douglas Lilac, Saint Johns, FL (US); Frederick A. Flitsch, New Windsor, NY (US); Camille Higham, Jacksonville, FL (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 37 days.

(21) Appl. No.: 13/832,547

(22) Filed: Mar. 15, 2013

(65) Prior Publication Data

US 2014/0268023 A1  Sep. 18, 2014

(51) Int. Cl.
*G02C 7/04* (2006.01)
*G02C 7/02* (2006.01)
*B29D 11/00* (2006.01)

(52) U.S. Cl.
CPC *G02C 7/04* (2013.01); *G02C 7/022* (2013.01); *B29D 11/00009* (2013.01); *G02C 7/046* (2013.01); *G02C 7/049* (2013.01); *B29D 11/00817* (2013.01)

(58) Field of Classification Search
CPC ............ G02C 7/04; G02C 7/049; G02C 7/022
USPC ............. 351/159.01, 159.02, 159.33, 159.48, 351/159.7
See application file for complete search history.

(56) References Cited

U.S. PATENT DOCUMENTS

| | | | |
|---|---|---|---|
| 7,311,399 B2 * | 12/2007 | Phillips | 351/159.61 |
| 2004/0027536 A1 * | 2/2004 | Blum et al. | 351/168 |
| 2008/0074613 A1 | 3/2008 | Phillips | |
| 2009/0091818 A1 * | 4/2009 | Haddock et al. | 359/319 |
| 2010/0072643 A1 * | 3/2010 | Pugh et al. | 264/2.7 |
| 2012/0120365 A1 | 5/2012 | Legerton et al. | |
| 2012/0218508 A1 | 8/2012 | Pugh et al. | |
| 2012/0234453 A1 | 9/2012 | Pugh et al. | |
| 2012/0268712 A1 | 10/2012 | Egan et al. | |

FOREIGN PATENT DOCUMENTS

| | | |
|---|---|---|
| EP | 2512777 B1 | 10/2012 |
| WO | WO 2012051167 A1 | 4/2012 |
| WO | WO 2012122411 A1 | 9/2012 |

OTHER PUBLICATIONS

EP Search Report—Date of Completion Aug. 1, 2014 Dat3e of Mailing Aug. 8, 2014 for : EP 14 16 0120.
SG Search Report—Date of Completion: Jan. 26, 2015 Date of Mailing: Feb. 13, 2015: Date Received from Agent to J&J: Apr. 13, 2015.

* cited by examiner

*Primary Examiner* — Darryl J Collins

(57) ABSTRACT

The present invention describes single-piece or multi-piece Rigid Inserts that may be included in an Ophthalmic Lenses or may comprise the Ophthalmic Lens, wherein the Rigid Insert may be formed through the processing of thin sheet material by thermoforming. Single piece annular Rigid Inserts may perform the function of providing a template for printed patterns to be included in Ophthalmic Lenses. Single piece full Rigid Inserts may perform the function of polarizing light or filtering light based on the properties of materials used to form the insert. Multi-piece Rigid Inserts may include activation and energization elements. The present invention also includes methods and apparatus for forming the Rigid Inserts.

7 Claims, 10 Drawing Sheets

THERMOFORMED OPHTHALMIC INSERT DEVICES

FIELD OF USE

This invention describes methods, apparatus and devices related to thermoforming of insert pieces for inclusion into other Ophthalmic Devices and more specifically, in some embodiments, manners of using thermoforming aspects in the fabrication of an Ophthalmic Lens with a Rigid Insert within which or upon which are components.

BACKGROUND

Traditionally an Ophthalmic Device, such as a contact lens, an intraocular lens, or a punctal plug included a biocompatible device with a corrective, cosmetic, or therapeutic quality. A contact lens, for example, can provide one or more of vision-correcting functionality, cosmetic enhancement, and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics may be accomplished without the lens entering into an energized state.

More recently, active components have been incorporated into a contact lens.

An alternative solution may involve the incorporation of energizing elements within the Ophthalmic Device. The relatively complicated components to accomplish this effect may derive improved characteristics by including them in insert devices, which are then included with standard or similar materials useful in the fabrication of state of the art Ophthalmic Lenses. It may be desirable to improve the process, methods, and resulting devices for realizing inserts of various kinds. It may be anticipated that some of the solutions for energized inserts may provide novel aspects for non-energized devices and other biomedical devices. Accordingly novel methods, devices, and apparatus relating to the thermoforming of various components in ophthalmic and biomedical devices formed with inserts are therefore important.

SUMMARY

The present invention includes innovations relating to the method of forming Ophthalmic Lens with a thermoformed insert device, the Ophthalmic Lens comprising a thermoformed insert device, wherein the thermoformed insert device comprises a first insert piece, wherein the first insert piece is a thermoformed material of a three-dimensional shape, and a hydrogel encapsulant around the thermoformed insert device.

In some embodiments, the thermoformed insert device may further comprise an alignment feature. In some embodiments, the thermoformed insert device may further comprise an optic zone, wherein the thermoformed material in at least the optic zone has the ability to polarize light that traverses the optic zone. Alternatively, the thermoformed insert may be annular, wherein a circular portion in the center of the thermoformed insert may be removed during the thermoforming process.

The thermoformed insert device may comprise a plurality of layers of material. A first layer of material may have dielectric properties and encloses a portion of a conductive material located upon a surface of the insert piece. The first layer of material may have insulating properties and enclose a portion of a conductive material located upon a surface of the insert piece. In some embodiments, a layer of material may alter the hydrophobicity of the surface of the insert piece.

Some such embodiments may include a layer of colorant covering a portion of the insert piece, for example, in an iris pattern. A polarizing layer may be located between a second and third layer, which may be adjacent to the first layer, and wherein the second and third layer may orient the polarizing layer. The polarizing layer may be aligned with respect to the alignment feature located within the body of the first insert piece. In such embodiments, the Ophthalmic Lens may additionally comprising a stabilizing feature included in the Ophthalmic Lens device, wherein the stabilizing feature orients the lens device in a predefined orientation on an eye. The Stabilizing Feature may be tinted or marked to provide a visual orientation cue, wherein the Stabilizing Feature may indicate to the user how to orient the Ophthalmic Lens on the eye.

In some embodiments, the thermoformed insert device may comprise a second insert piece, wherein the second insert piece is a thermoformed material of a three-dimensional shape, wherein a cavity is defined in a region between the first insert piece and the second insert piece. The thermoformed insert device may further comprise a first alignment feature located on the first insert piece and a second alignment feature located on the second insert piece. The first alignment feature may interlock with the second alignment feature. The thermoformed insert device may further comprise a sealing layer between the first insert piece and second insert piece that seals the first insert piece and second insert piece together along at least portions of their surfaces.

In some embodiments, the thermoformed insert device further may comprise a meniscus lens active optic element, wherein the meniscus lens active optic element is located between the first insert piece and the second insert piece. Alternatively, the thermoformed insert device may include an active agent, wherein the active agent may dissolve into the ophthalmic environment when the Ophthalmic Lens is placed on an eye.

DETAILED DESCRIPTION OF THE INVENTION

Figure 1:
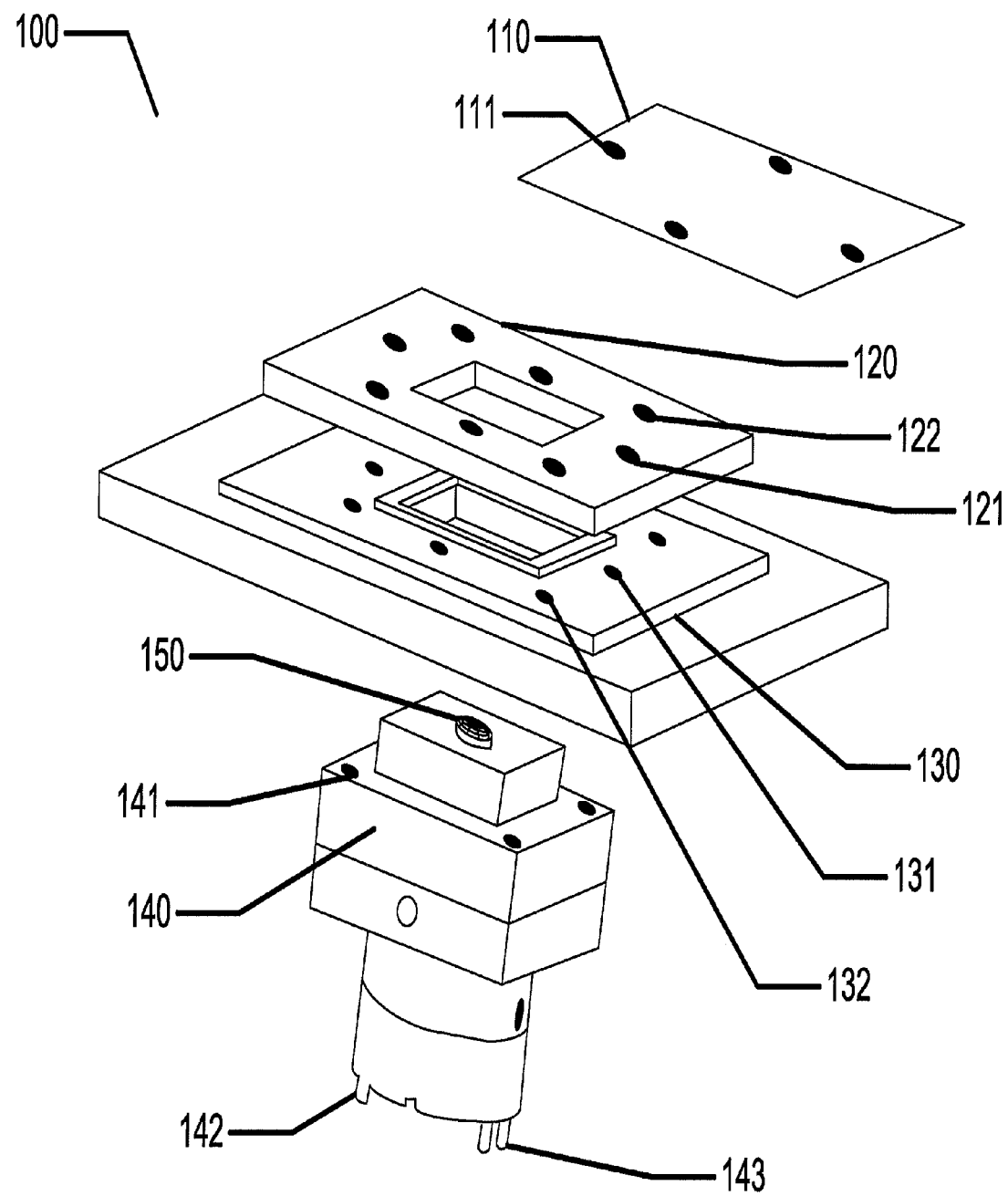
FIG. 1 illustrates an exemplary thermoforming apparatus according to some embodiments of the present invention.

The present invention includes methods and apparatus for manufacturing an Ophthalmic Lens with a Rigid Insert where portions of the insert may be formed by the method of thermoforming. In addition, the present invention includes an Ophthalmic Lens with a Rigid Insert incorporated into the Ophthalmic Lens.

According to the present invention, an Ophthalmic Lens may be formed with an embedded Insert, which in some cases includes an Energy Source, such as an electrochemical cell or battery as the storage means for the energy. In some embodiments, a Rigid Insert also includes a pattern of circuitry, components, and Energy Sources. Various embodiments may include the Rigid Insert locating the pattern of circuitry, components, and Energy Sources around a periphery of an optic zone through which a wearer of a lens would see, while other embodiments may include a pattern of circuitry, components, and Energy Sources that are small enough to not adversely affect the sight of a contact lens wearer and therefore the Rigid Insert can locate them within, or exterior to, an optical zone. The insert pieces of single-piece and multi-piece Rigid Inserts may be formed by thermoforming Numerous steps may occur on a thin substrate sheet before thermoforming or on an insert piece after thermoforming that may address the various component functions of insert-based Ophthalmic Devices.

In general, according to some embodiments of the present invention, a Rigid Insert may be embodied within an Ophthalmic Lens via automation that may place the insert a desired location relative to a mold part used to fashion the lens. The embodiments that place the various components into the Ophthalmic Lens may employ one or more steps where components are sealed and adhered into place or components are encapsulated.

In some embodiments, an Energy Source may be placed in electrical communication with a component that can be activated on command and draws electrical current from the Energy Source included within the Ophthalmic Lens. A component may include, for example, a semiconductor device, an active or passive electrical device, or an electrically activated machine, including for example: Microelectromechanical systems (MEMS), nanoelectromechanical systems (NEMS), or micromachines. Subsequent to placing the Energy Source and component, a Reactive Mixture can be shaped by the mold part and polymerized to form the Ophthalmic Lens.

In the following sections detailed descriptions of embodiments of the invention will be given. The description of both preferred and alternative embodiments are exemplary embodiments only, and it is understood that to those skilled in the art that variations, modifications, and alterations may be apparent. It is therefore to be understood that said exemplary embodiments do not limit the scope of the underlying invention.

GLOSSARY

In this description and claims directed to the presented invention, various terms may be used for which the following definitions will apply:

Back Curve Piece or Back Insert Piece: as used herein refers to a solid element of a Rigid Insert which when assembled into the said insert will occupy a location on the side of the lens that is on the back. In an Ophthalmic Device, such a piece would be located on the side of the insert that would be closer to the user's eye surface. In some embodiments, the back curve piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple back curve pieces and one of them may include the optic zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Front Curve Piece or Front Insert Piece: as used herein refers to a solid element of a Rigid Insert, which when assembled into the said insert will occupy a location on the side of the lens that is on the front. In an Ophthalmic Device, a Front Curve Piece would be located on the side of the insert that would be further from the user's eye surface. In some embodiments, the piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple front curve pieces and one of them may include the optic zone, while others may be annular or portions of an annulus.

Lens-forming mixture or Reactive Mixture or Reactive Monomer Mixture (RMM): as used herein refers to a monomer or prepolymer material that can be cured and cross-linked or cross-linked to form an Ophthalmic Lens. Various embodiments can include lens-forming mixtures with one or more additives such as UV blockers, tints, photoinitiators or catalysts, and other additives one might desire in an Ophthalmic Lenses such as, contact or intraocular lenses.

Lens-forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens forming surface can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: refers to a rigid or semi-rigid object that may be used to form lenses from uncured formulations. Some preferred molds include two mold parts forming a front curve Mold part and a back curve Mold part.

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: To restore to a state with higher capacity to do work. Many uses within this invention may relate to restoring a device to the capability to flow electrical current at a certain rate for a specified, reestablished time period.

Released from a Mold: means that a lens is either completely separated from the mold, or is only loosely attached so that it can be removed with mild agitation or pushed off with a swab.

Rigid Insert: as used herein refers to an insert that maintains a predefined topography. When included in a Contact Lens, the Rigid Insert may contribute to the functionality of the Lens. For example, varying topography of or densities within the Rigid Insert may define zones, which may correct vision in users with astigmatism.

Stabilizing Feature: as used herein refers to a physical characteristic that stabilizes an Ophthalmic Device to a specific orientation on the eye, when the Ophthalmic Device is placed on the eye. In some embodiments, the Stabilizing Feature may add sufficient mass to ballast the Ophthalmic Device. In some embodiments, the Stabilizing Feature may alter the front curve surface, wherein the eyelid may catch the Stabilizing Feature and the user may reorient the Lens by blinking. Such embodiments may be enhanced by including Stabilizing Features that may add mass. In some exemplary embodiments, Stabilizing Features may be a separate material from the encapsulating biocompatible material, may be an insert formed separately from the molding process, or may be included in the Rigid Insert or Media Insert.

Stacked Integrated Component Devices or SIC Devices as used herein refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours.

Three-dimensional Surface or Three-dimensional Substrate: as used herein refers to any surface or substrate that has been three-dimensionally formed where the topography is designed for a specific purpose, in contrast to a planar surface.

Thermoforming

In a thermoforming process, a thin sheet of material is heated to a temperature where it becomes flexible or easily bent. The sheet of material is then bent or thermoformed to a predefined shape by a mold piece. By pressing the sheet onto the mold and typically evacuating the air at the interface of the mold and sheet, the material is deformed into a three-dimensional shape that similarly matches the mold piece. Upon cooling, an appropriate thin sheet material may maintain the three dimensional shape that it has been formed into.

Proceeding to FIG. 1, an exemplary apparatus 100 for thermoforming a sheet may be found. The illustrated apparatus 100 is an exemplary embodiment of an apparatus that may perform thermoforming, but other alternative embodiments of an apparatus that performs thermoforming may be consistent with the art herein. In some embodiments, a sheet 110 of material, which may be thermoformed, may have holes 111 punched into the sheet 110 so that the sheet may be fixedly held in place by other portions of the apparatus.

The sheet 110 may be held in place by placement between a top holding piece 120 and a lower holding piece 130. Pins may align the holes 121 on the top holding piece 120 and the holes 131 on the lower holding piece 130 with the alignment holes 111 punched into the sheet 110. Once the sheet 110 is between the top holding piece 120 and the lower holding piece 130, the holding pieces 120 and 130 may be rigidly held together. In some embodiments, a locking feature such as, for example, a screw, may feed through a hole 121 in the top holding piece 120 at a location external to the thin sheet 110. For example, a screw may feed into a threaded hole 132 to fixedly hold the sheet 110 in place. In other embodiments, the thermoforming equipment may hold the sheet 110 in place without the use of screws or locking feature.

The held and aligned sheet 110 may be processed using numerous types of equipment that may utilize alignment holes 122 and 132 for the alignment of the held sheet 110. These processes may occur before or after thermoforming, but in this exemplary embodiment, the held sheet 110 may be processed for the step of thermoforming. In such embodiments, a pin that protrudes through the lower holding piece 130 may locate the alignment features 122 and 132. The pin may extend above the lower holding piece 130 to align the sheet 110 and the top holding piece 120 and below the lower piece 130 to align the sheet with the molding features of the thermoforming apparatus 140. The pins below the lower holding piece 130 may mate in an aligned fashion to alignment holes 141 on the thermoforming apparatus 140.

In some embodiments, the molding apparatus 100 and the thin sheet 110 may be warmed to an appropriate temperature to make the sheet pliable, and then pressure may be applied to push the thin sheet 110 that is held between the top holding piece 120 and the lower holding piece 130 onto a molding piece 150. As pressure is applied, a vacuum may be drawn near or at the surface of the molding piece 150 through the molding apparatus 100 through connection points 142 and 143. In some embodiments, the temperature may be controlled at the molding piece 150. In alternate embodiments, a temperature-controlled fluid may be flowed through the molding apparatus 100 through connection points 142 and 143. In still other embodiments, a power source, such as an electrical current, may heat the forming mold through connection points 142 and 143. In other embodiments, the entire environment of the sheet 110 and thermoforming apparatus 140 may be held at an appropriate temperature for thermoforming of the thin sheet 110 material.

When the pressure and vacuum are removed from holding the thin sheet 110 onto the molding piece 150, the sheet 110 may be pulled clear of the molding piece 150. When the sheet 110 cools, it may reassume rigidity in the three-dimensionally formed shape imparted to the sheet 110 by the thermoforming molding process.

Figure 2:
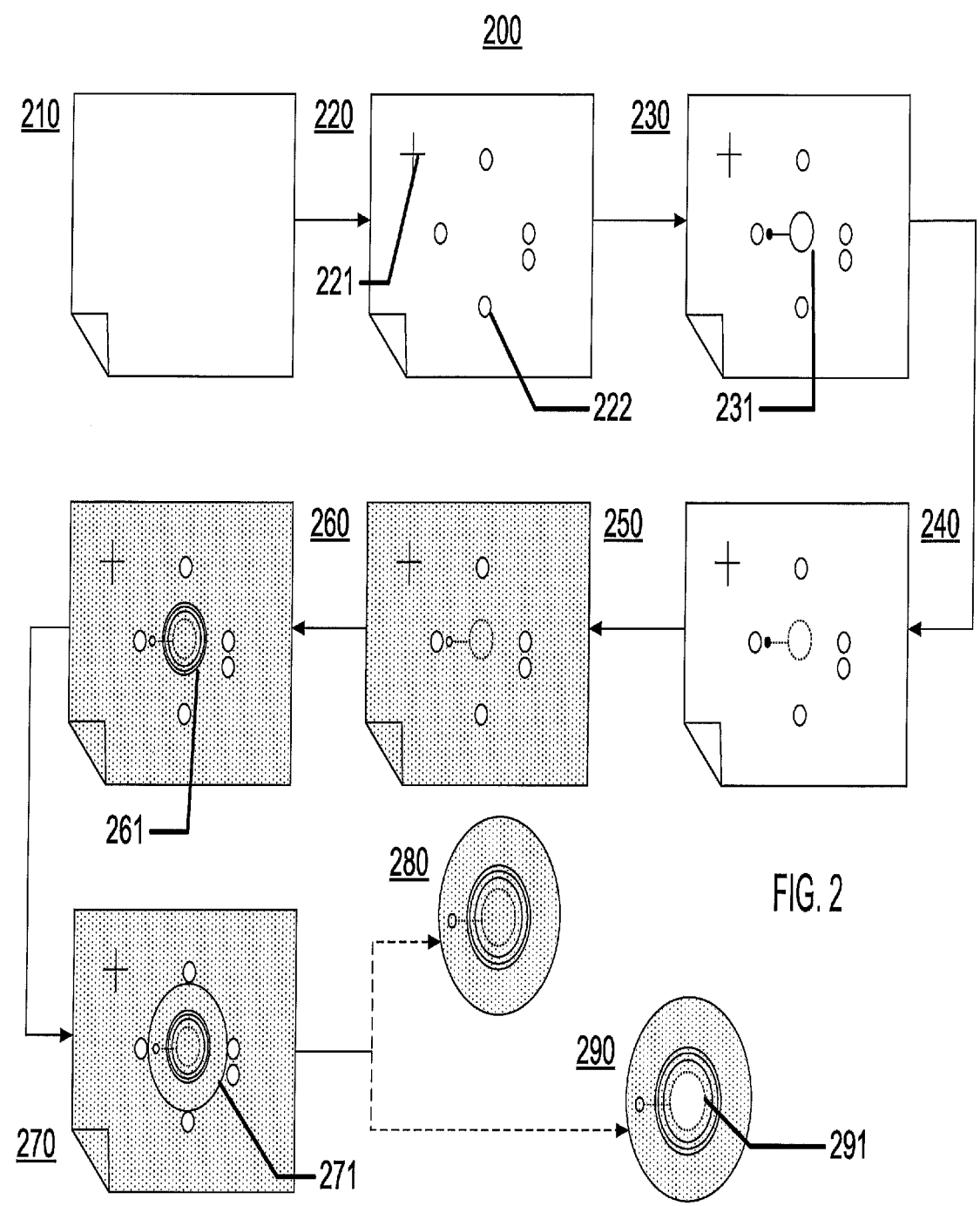
FIG. 2 illustrates exemplary processing steps to thermoform a component consistent with an active energized Ophthalmic Lens.

Proceeding to FIG. 2, an exemplary progression 200 of a sheet processed to form an insert piece that may then be thermoformed is illustrated. This progression 200 is for exemplary purposes only, and other modifications and sequences are within the scope of this invention.

The progression 200 may begin at step 210 wherein a thin sheet 211 of thermoformable material may be provided. In some embodiments, for example, the thin sheet 211 may be comprised of polycarbonate. Further examples of thin sheet thermoforming material are included in Table 1. In some embodiments, at step 220, the sheet 211 may be processed to have alignment marks placed on it 221. For example, said alignment marks 221 may be printed upon the sheet 211, punched into the sheet 211, or cut out from the sheet 211. Some embodiments may include holes 222 that are punched into the sheet 211 to facilitate the holding of the sheet 211 in a thermoforming apparatus 100, such as, for example, in FIG. 1.

In some embodiments, at step 230, conductive traces 231 may be formed upon the sheet 211. These traces 231 may be formed by coating the sheet 211 with films of conductive material followed by patterned removal of regions of the conductive material to form traces 231. In alternate embodiments, the traces 231 may be printed upon the surface with conductive inks. Any method of forming conductive traces 231 upon a flat sheet may be consistent with the art herein.

In some embodiments, at step 240, the conductive traces 231 may be coated at least in part by an insulating material. A deposition of insulator may be important for some specific methods of manufacture, such as, for example, the formation of inserts for meniscus lens embodiments. In some embodiments, at step 250, regions of the insert piece may be coated with a film to alter the hydrophobicity of the surface. In the exemplary embodiment, at step 250, the entire sheet 211 may be coated, but embodiments that coat only a portion of the sheet 211, such as, for example, only the region that will become the insert piece, are also within the scope of this invention. Step 250 may be consistent with embodiments related to the formation of meniscus type active lenses. At step 260, the thin sheet 211 may be processed with a thermoforming step creating a three-dimensional shape 261 to the surface of the thin film material.

In some embodiments, after 260, the thermoformed sheet 211 may subsequently be processed to create isolated insert pieces. At step 270, a roughly circular-shaped insert piece may be formed by cutting out a specified portion 271 of the thermoformed sheet. The method of cutting may include, for example, mechanical shearing, punching, or cutting with energized beams, such as laser cutting, plasma cutting, chemical reaction cutting, or high pressure fluid jet cutting.

The next step may depend on the preferred resulting insert piece embodiment. At step 280, the insert piece may be removed from the sheet 211 with a central optic portion. In alternative embodiments, at step 290, the insert piece may be removed from the sheet 211 where the central optic portion 291 may also be removed creating an annular insert piece. In this exemplary embodiment, the thermoformed sheet 211 progresses from step 270 to either step 280 or step 290. In other embodiments, step 280 may be an intermediate step between step 270 and step 290. Other combinations and variations of this progression may be apparent to those ordinarily skilled in the art and are considered within the scope of the art herein. Utilizing the techniques as have been discussed, more complicated insert pieces may be formed.

TABLE 1

Exemplary Thermoforming Materials
Film Type

Figure 3:
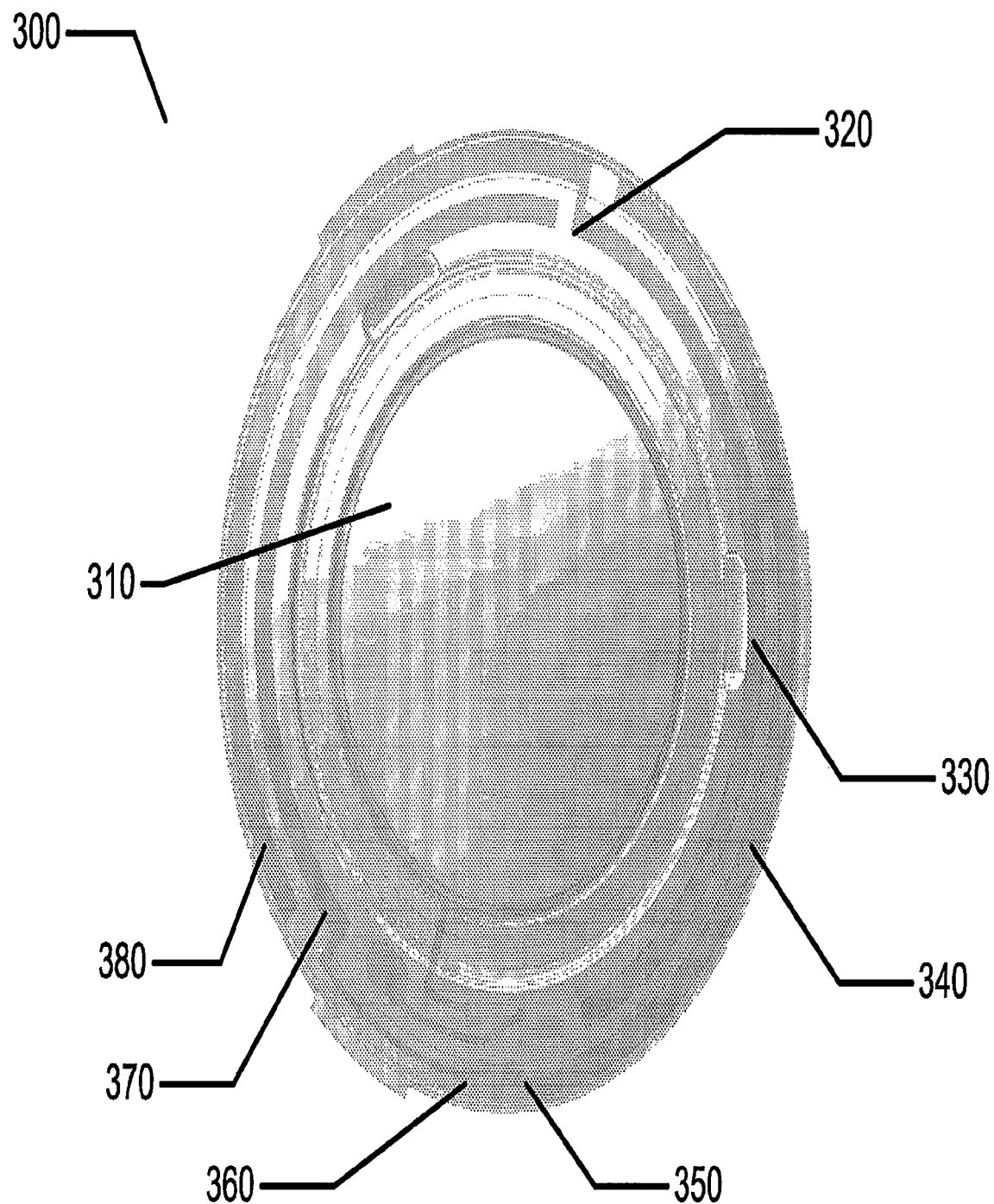
FIG. 3 illustrates an exemplary complex insert piece that may be thermoformed according to some embodiments of the present invention.

Acrylonitrile Butadiene Styrene
Polycarbonate
Polystyrene
Polyvinyl Chloride
Biaxially oriented polypropylene
Polyethylene terephthalate (PET)
Amorphous PET
PET-glycol
Orientated PET
Biaxially oriented polypropylene
Cyclic Olefin Copolymer Proceeding to FIG. 3, an ophthalmic insert 300 from a thermoformed sheet is illustrated. In some embodiments, the ophthalmic insert 300 may include numerous important features that result from thermoforming a sheet into a three-dimensional piece. For example, in some embodiments, the optic zone 310 of an Ophthalmic Device formed with the insert 300 may include an optically clear feature. In such embodiments, various material choices and thermoforming equipment settings may address the optical clarity of a thermoformed surface.

Conductive traces 320, 330, 340, 370, and 380 may be added to the thin film surface before thermoforming or to the three dimensional shape after thermoforming. In some embodiments, the surface may include one or both of isolated conductive traces 340 and 370 or electrically connected traces 330 and 380 with a connection point at 320. The placement of the traces 320, 330, 340, 370, and 380 on the ophthalmic insert 300 is for exemplary purposes only, and other configurations may be appropriate in some alternative embodiments. The arrangement may be useful in forming an energized insert with two electrochemical battery cells connected in a series fashion. The resulting energization element may have connection points 350 and 360. Components capable of drawing an electrical current from an energization element may be attached, for example, to the connection points 350 and 360 or, in other embodiments, other locations on the depicted ophthalmic insert embodiment.

Alignment Aspects of Thermoformed Inserts

For complex insert components including three-dimensional shapes, conductive traces, and other components attached or integrated to the three-dimensionally shaped inserts, the location of the features and the three-dimensional shapes both relatively and globally to other Ophthalmic Lens aspects may be significant. Alignment features on the insert piece may be useful in precision placement of the components. There may be various designs consistent with alignment needs including crosses, verniers, lines, and similar such features. The equipment that processes the thin film substrate may utilize these features to move the sheet and attached or holding hardware to an internal alignment location within its operating space. In some embodiments, the alignment feature may be a portion of the thin film substrate that may be cut away during processing.

Figure 4:
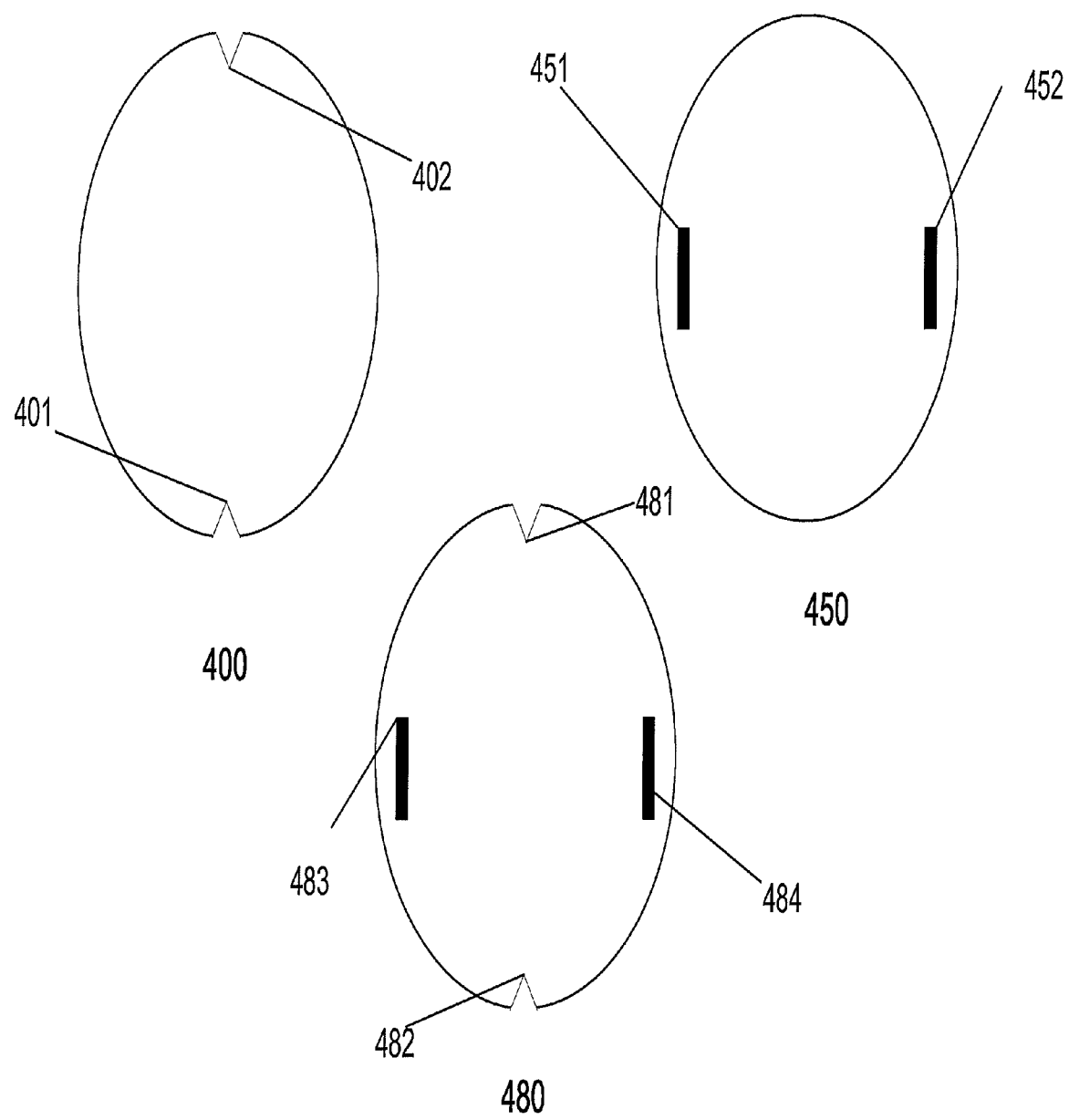
FIG. 4 illustrates exemplary alignment features and strategies that may be incorporated into inserts utilizing the principles of thermoforming.

Proceeding to FIG. 4, strategies or features that may create secondary alignment features during the processing to cut out the insert piece are illustrated. A thermoformed, three dimensionally shaped insert piece 400 that has been cut out from the thin sheet may have notches 401 and 402 cut out. Different embodiments may include notches of varying shape including, for example, a v-shaped notch, a circular-shaped notch, and a square-shaped notch. Notches 401 and 402 may be located in various locations on the insert piece 400, including, for example, at antipodal locations. The notches 401 and 402 may serve a variety of alignment functions. For example, the notches 401 and 402 may provide the rotational alignment of the piece, whereas, in some other embodiments, alignment features 401 and 402 on the insert piece 400 may create the alignment in the translational axes of the paper.

In other embodiments, the insert piece 450 may have grooves 451 and 452. These grooves 451 and 452, or in some embodiments cut outs, may function similarly to the notches 401 and 402, wherein the grooves 451 and 452 assist in alignment during the process of removing the insert piece 450 from a thin sheet, as shown in FIG. 2. In some embodiments, particularly where the insert is comprised of multiple pieces, grooves 451 and 452 may provide a locking function. Said embodiments may include another insert piece, not shown, with protrusions that may fit into the grooves 451 and 452.

In some embodiments of an insert piece 480, there may be more than one alignment features or notches. For example, some insert pieces 480 may have notches 481 and 482 for an apparatus to place the piece with precision and may include grooves 483 and 484 to ensure proper alignment with another piece. The insert pieces may also include flat features that act similarly to the notches by preventing unwanted rotation of the insert piece.

There may be numerous manners that processing equipment may utilize notches of the type depicted. For example, a working surface of a piece of equipment may have alignment pins temporarily or permanently located on a surface. By moving the insert piece such that its notches locate upon the pins, the insert piece may be simultaneously held in place and located in the translational plane. The rotational orientation in such an embodiment may be limited to two acceptable rotational orientations that are 180 degrees apart. Alternatively, a three-dimensionally formed insert piece may inherently be limited in orientations, necessitating fewer alignment features for precise placement.

Figure 5:
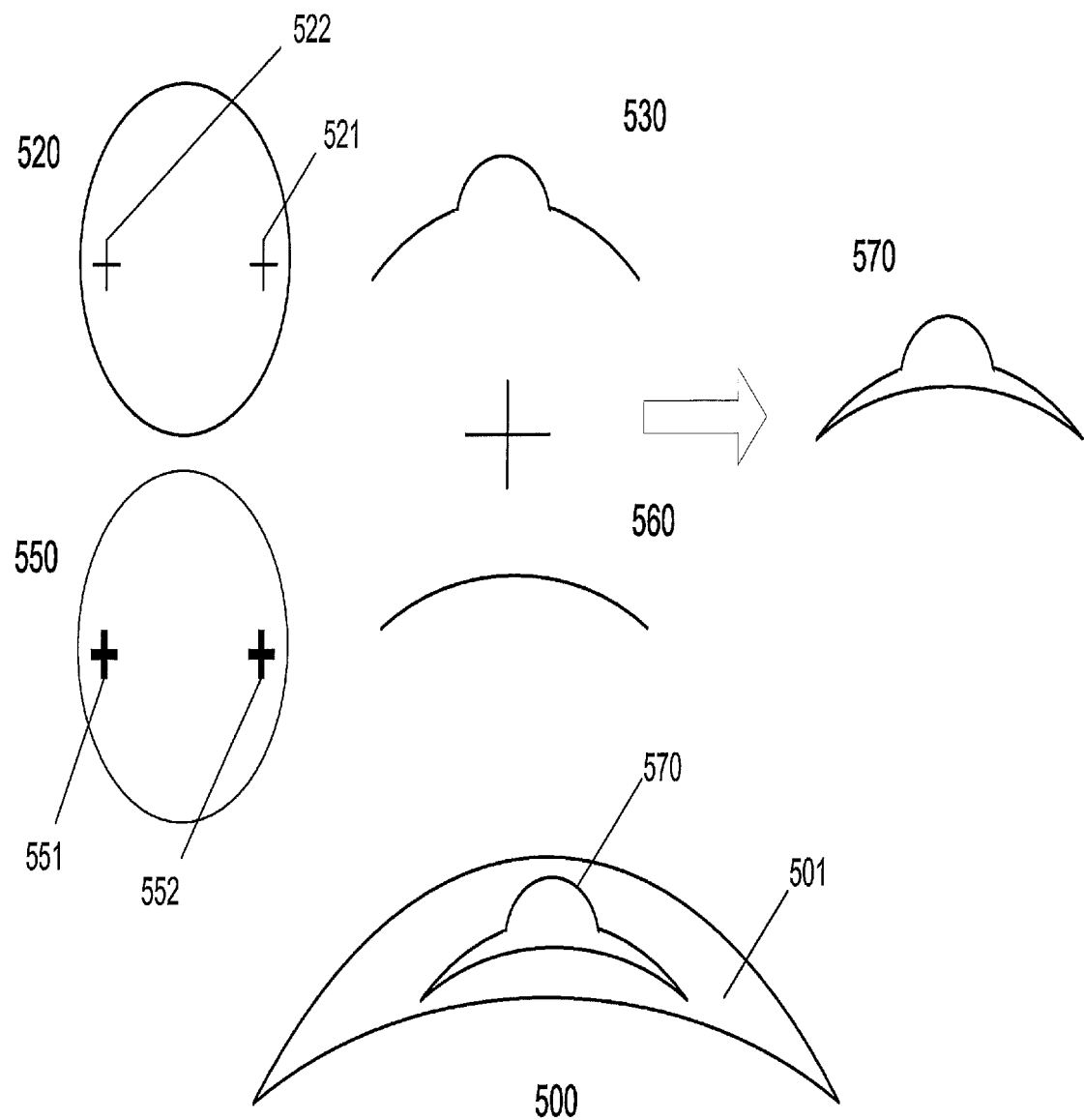
FIG. 5 illustrates an exemplary Rigid Insert embodiment utilizing the principles of thermoforming.

Proceeding to FIG. 5, an embodiment of an Ophthalmic Lens 500 with a thermoformed Rigid Insert 570 is illustrated. In some embodiments, a three-dimensionally formed insert piece 520 may form a front insert piece of a Rigid Insert 570, and a second three-dimensionally formed insert piece 550 may form a back insert piece of a Rigid Insert 570. The front insert piece 520 may have alignment features 521 and 522 that fit with the alignment features 551 and 552 of the back insert piece 550.

In a cross-sectional view, the front insert piece 530 may be combined with the back insert piece 560 to form a Rigid Insert 570. The insert pieces 530 and 560 may be three-dimensionally formed to create a sealed portion. In some embodiments, for example, the sealed portion may contain a liquid meniscus in electrical communication with energization elements, which may allow for a variable optic. The Rigid Insert 570 may be encapsulated in an Ophthalmic Lens 500. In some embodiments, the encapsulant 501 may be a biocompatible polymerized material such as a silicone hydrogel, including, for example, Etafilcon, Narafilcon, Galyfilcon, and Senofilcon.

The alignment features 521, 522, 551, and 552 may allow the two insert pieces 520 and 550 to lock into place without direct force to the Optic Zone portion or the component. This may allow for more delicate, but precise, assembly of a Rigid Insert 570. For example, a liquid meniscus may be susceptible to damage caused by pressure or heat. In some embodiments, the front piece insert 520 may be locked into the back piece insert 550, and the locking between the alignment features 521, 522, 551, and 552 may maintain the positions of the two pieces 520 and 550. The Rigid Insert 570 may be further secured by applying focused pressure or heat to more robust portions of the insert 570.

Rigid Inserts may also be useful for embodiments with annular shapes. There may be numerous uses for annular inserts in Ophthalmic Lenses including embodiments that may sense the ophthalmic environment that the lens sits in, such as a means for glucose monitoring. Rigid Inserts may also include a printed patterns or Stabilizing Features in the non-Optic Zone portion.

In such embodiments, an active meniscus-based lens may be contained within the insert. For example, the Optic Zone may contain at least two immiscible fluids that form an interface between them that may act as a focal element. Various energization elements may be included in regions outside the Optic Zone of the insert. The energization elements may include, for example, integrated circuits, passive electronic components, energization elements, and activation elements that may control the nature of the meniscus based lens.

Figure 6:
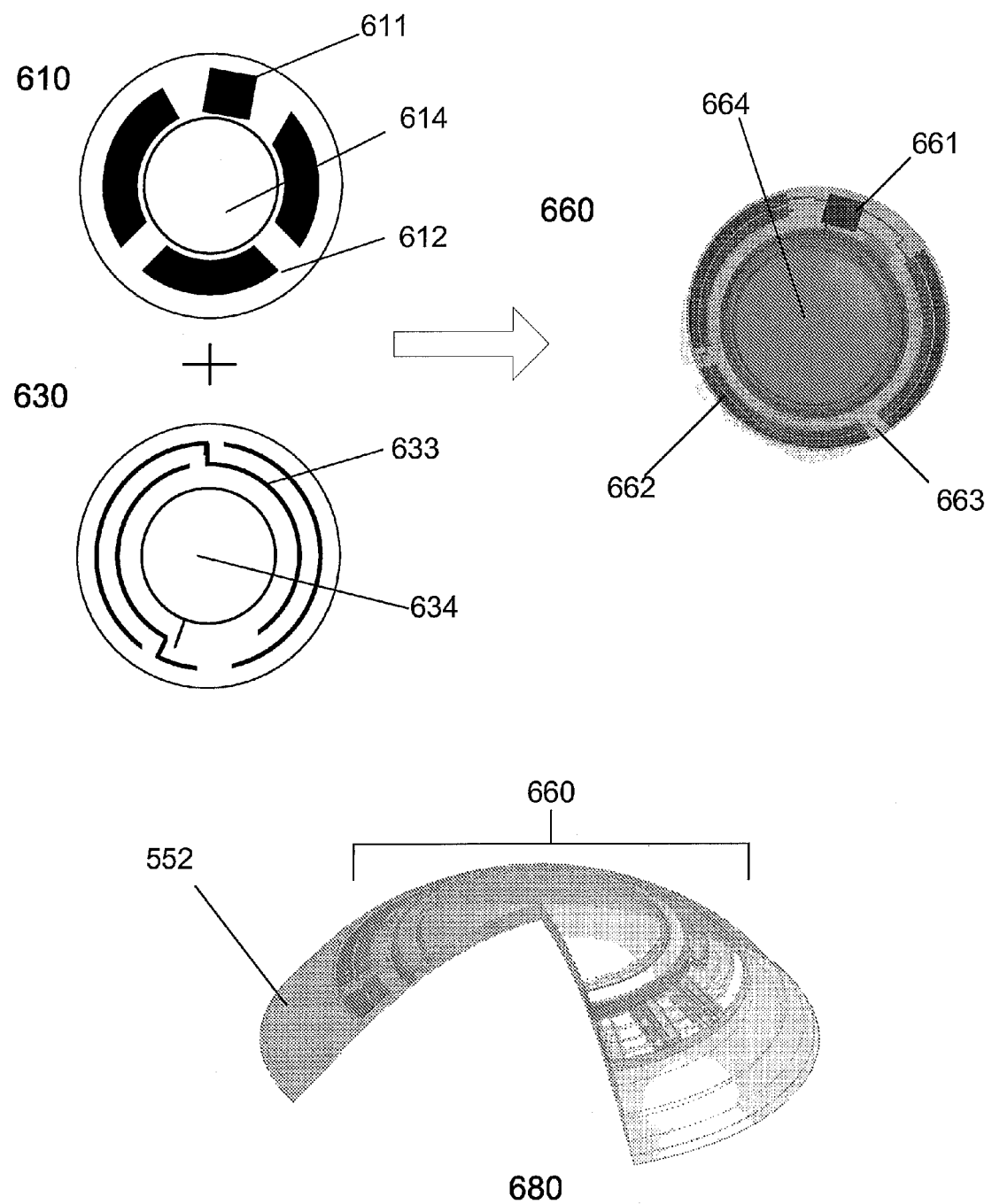
FIG. 6 illustrates an exemplary Media Insert embodiment utilizing the principles of thermoforming.

Proceeding to FIG. 6, an exemplary front insert piece 610 and back insert piece 630 are illustrated with the Media Insert 660 that may result in the combination of the two pieces 610 and 630. The front insert piece 610 may be thermoformed to include recesses 611 and 612 as alignment features for energization elements 662 and a controlling load 661 in the Media Insert 660. Said recesses 611 and 612 may provide additional protection of the electrical components 661 and 662 within the Media Insert 660. The back insert piece 630 may contain guidelines 633 for the conductive traces 663 that may interconnect the electrical components 661 and 662. Alternatively, in some embodiments, the conductive traces 663 may be directly applied during the thermoforming process, before or after the insert piece 630 has been removed from the surrounding sheet, as in FIG. 2.

In some embodiments, the Media Insert 660 may be included in an Ophthalmic Device 680, which may comprise a polymeric biocompatible material. The Ophthalmic Device 680 may include a rigid center, soft skirt design wherein a central rigid optical element comprises the Media Insert 660. In some specific embodiments, the Media Insert 660 may be in direct contact with the atmosphere and the corneal surface on respective anterior and posterior surfaces, or alternatively, the Media Insert 660 may be encapsulated in the Ophthalmic Device 680. The periphery or encapsulant 681 of the Ophthalmic Lens 680 may be a soft skirt material, including, for example, a hydrogel material.

Figure 7:
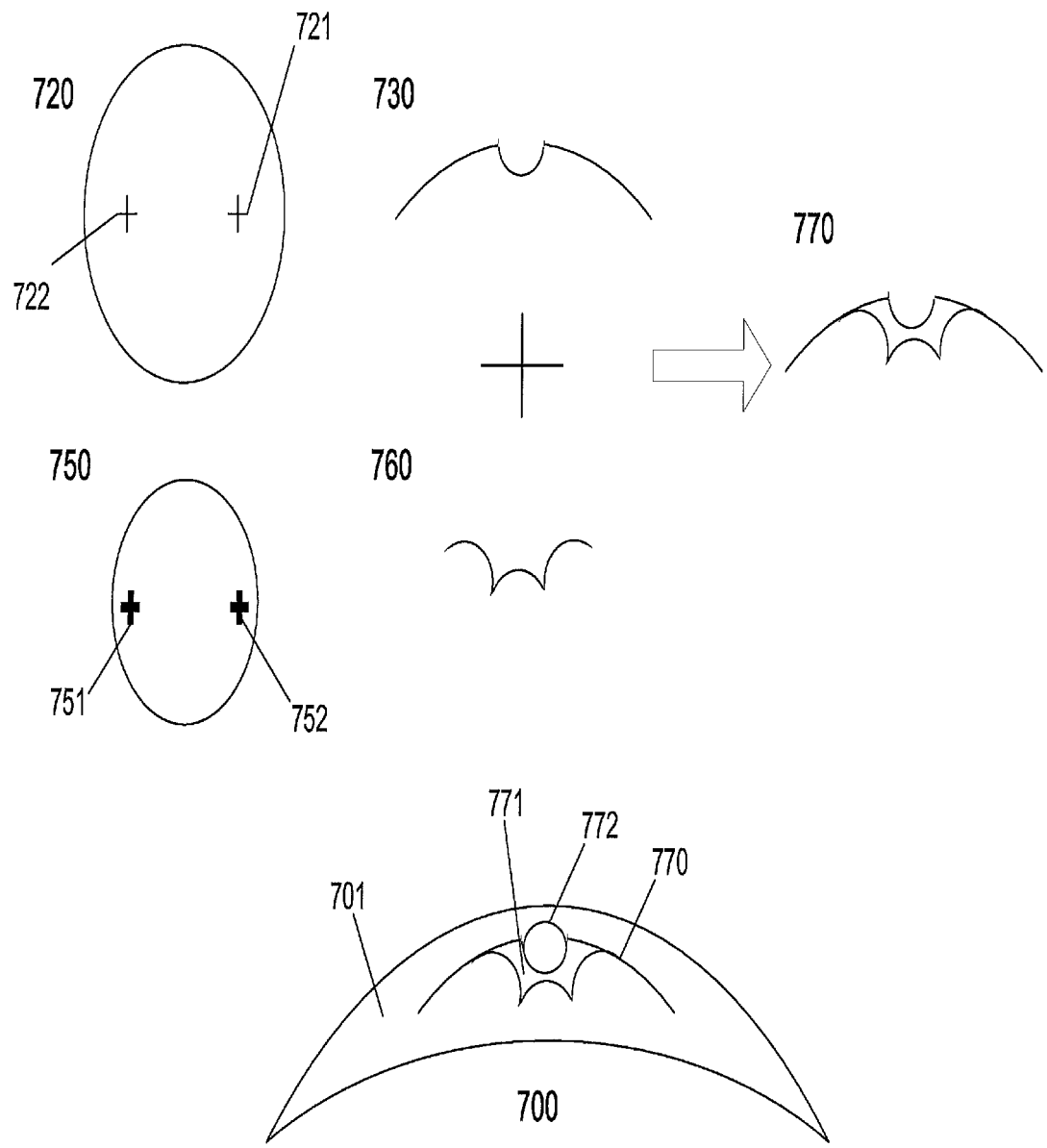
FIG. 7 illustrates an exemplary lenslet based embodiment utilizing the principles of thermoforming.

Proceeding to FIG. 7, an alternate embodiment of an Ophthalmic Lens 700 with a Rigid Insert 770 is illustrated. In some embodiments, the front insert piece 720 may be a different size than the back insert piece 750. Said embodiments also allow for thermoformed alignment features 721, 722, 751, and 752, wherein alignment features 721 and 722 on the front insert piece 720 may fit to the alignment features 751 and 752 on the back insert piece 750.

In a cross-sectional view, the Rigid Insert 770 may be three-dimensionally formed to allow for a passive optical function, such as, for example, a lenslet 771. A lenslet 771 may be located at the center of the Optic Zone of an Ophthalmic Lens 700. In this exemplary embodiment, the lenslet 771 is a concave device that may be filled with a material in a gaseous, liquid or solid state (including gelled solids) where the index of refraction may be different from the surrounding Ophthalmic Lens material 701. In some embodiments, the lenslet 771 may provide a focal altering characteristic. For example, the lenslet 771 may provide focusing and magnification of an object located relatively close to the Ophthalmic Lens.

In forming the Rigid Insert 770, there may be numerous considerations for the processing. The lenslet 771 in some embodiments may be filled with a gaseous material. Since the pressure in the lenslet 771 may change with the temperature of processing and the temperature of use, it may be important to control the temperature of all processing steps after the multiple pieces are assembled and sealed into an insert. For example, maintaining the temperature around a set point of roughly 35 degrees Celsius in some embodiments may mitigate changes caused by filling the insert with liquids and or gelled or partially gelled solids with different index of refraction from either or both the thermoforming film material and Ophthalmic Lens encapsulating material. Alternatively, the lenslet 771 may hold an encapsulated lenslet material 772. In some embodiments, the lenslet material 772 may be coated, with parylene, for example, to isolate the lenslet material 772 from the surrounding material.

Functional Aspects of Thermoformed Inserts

Figure 8:
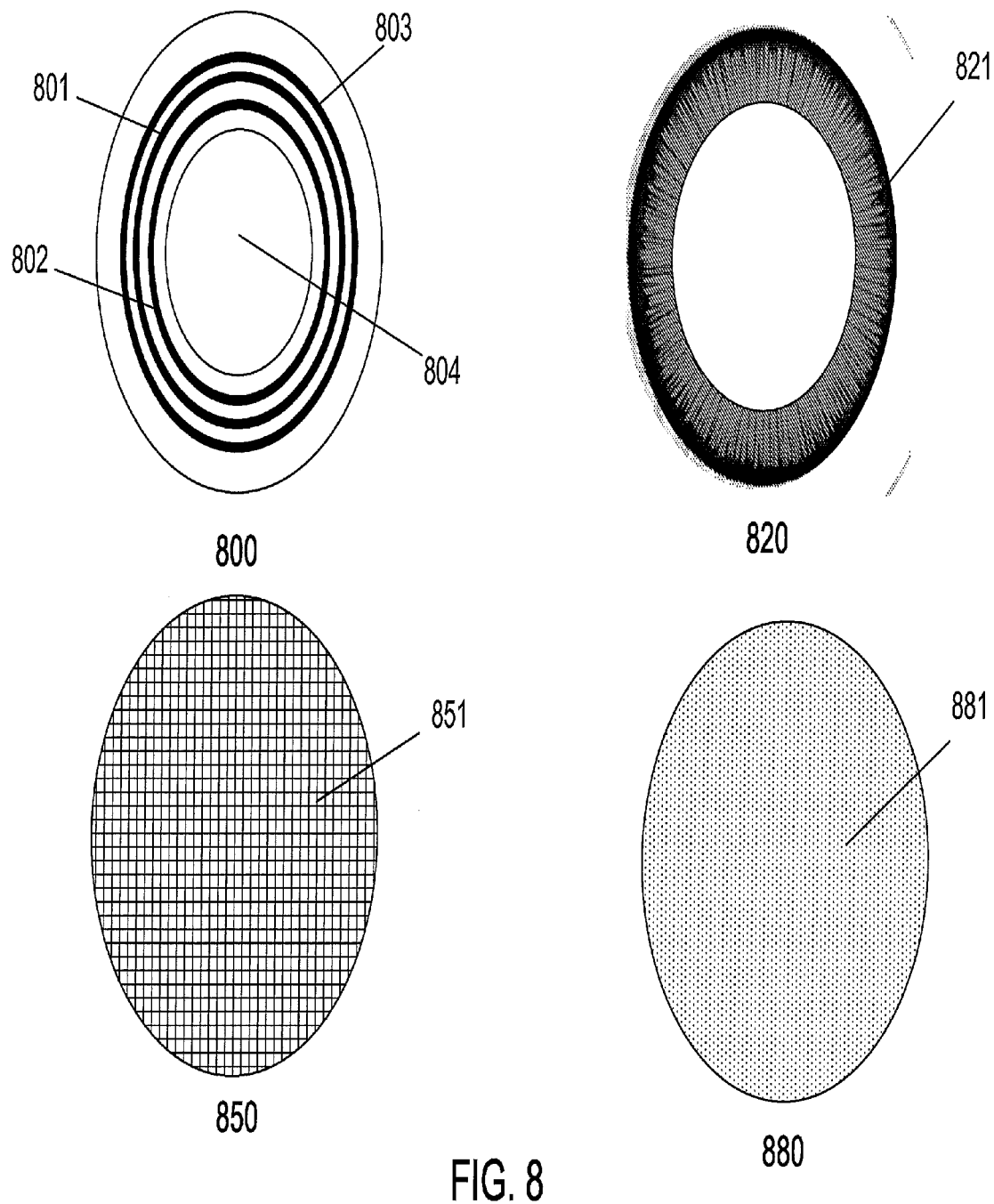
FIG. 8 illustrates exemplary functional features and strategies that may be incorporated in inserts utilizing the principles of thermoforming.

Proceeding to FIG. 8, examples of embodiments where thermoforming may add functionality to the insert piece are illustrated. An insert piece 800 may provide a means to deliver an active agent, such as medicine. Guidelines 801-803 may be thermoformed on the insert piece 800, or in some embodiments, the active agent may directly applied during thermoforming. Adding an active agent to an insert piece 800 may allow for controlled administering of a drug to the body through the eye.

In some embodiments, an insert piece 800 may be an annular shape with a central circular shape, which may have its center collocated with the external approximately circular shape removed. An annular shape may be appropriate where the function of the Ophthalmic Lens with an insert piece 800 may not be related to optical properties, such as, for example, where the purpose is to passively administer an active agent deposited on guidelines 801-803. The material removed from the internal regions may in practice assume a great diversity of shapes and also involve the nature of the three-dimensional features that may be thermoformed into the film. For example, the cutting process may remove those features with a height of deformation above a certain level.

In some embodiments, thermoforming may add colored design to the insert piece 820, which may give an Ophthalmic Lens a cosmetic function. The pattern 821 may have been applied before or after thermoforming and may be located on one or both of the major surfaces of a thermoformed insert. A printed pattern 821 may be located outside of the Optic Zone of the Ophthalmic Lens. Therefore, a printed pattern 821 may be included in embodiments where the Ophthalmic Lens has functions in addition to a cosmetic feature. For example, a printed pattern 821 may be included on a multi-piece Rigid Insert 570, such as shown in FIG. 5. In alternative embodiments, a printed pattern 821 may be included in annular insert pieces, such as, for example, where the function of the Ophthalmic Lens or the function of the Rigid Insert is not related to an optical quality. In some specific embodiments, a printed pattern 821 may be included in insert pieces 800 to mask active agent guidelines 801-803.

Alternatively, polarization features 851 may be thermoformed onto an insert piece 850. In some embodiments, such features 851 may be imparted to insert pieces 850 through properties of thin film starting materials. The innate polarizing properties of the starting material may be enhanced by thermoforming additional polarization features 851. Alternatively, the thermoforming process may be sufficient to impart the polarization features 851. The inclusion of polarizing features 851 to an insert piece 850 may add functionality in some embodiments that may contain passive, nonenergized inserts.

There are four major techniques for polarizing light through a transmissible material including wire grids, dichroic materials as is commonly employed in "polaroid filters", employment of Brewster's angles plates, and employment of birefringent or biaxial materials. The polarization function may be developed in an Ophthalmic Lens through a single technique or by a combination of techniques. For example, in some embodiments, the polarizing features 851 of an insert piece 850 may include wire grids and dichroic materials.

In some embodiments, the structure of the insert itself or layers placed upon the insert piece may polarize light that transmits through the ophthalmic insert optic zone. For example, the thermoforming thin film material that is used to form the insert may be constructed in a multilayer fashion, such as by stacking layers to form the structural function of the insert piece 850 and to polarize light. In some embodiments, the sheet of material from which the insert piece 850 is removed may be a sheet of thin metallic or conductive filaments or lines deployed in a parallel fashion to form a wire grid.

Alternatively, a film of dichroic materials may have polarizing properties imparted to it. Some embodiments may include layers of films, each contributing to the polarizing features 851. For example, the top and bottom films may act to protect the internal polarizing film, and the protecting layers may be three-dimensionally formed through the thermoforming process. A polarized insert piece 850 may also have printed patterns 821 included in the portion outside of the Optic Zone.

In other embodiments, a Rigid Insert may be comprised of insert pieces with polarizing features that, when layered in the Rigid Insert, may create a complex polarization element. For example, the polarizing features may be enhanced by thermoformed topography of an insert piece.

Some embodiments may include an insert piece 880 with a tinting 881 in the Optic Zone. In some embodiments, the color tint may be an innate property of the thin film material used as a starting material. In other embodiments, the coloring property may be added to the thin film material by depositions, applications, or other means of imparting a color to the thin film surface or bulk. A color tinting 881 may provide a variety of functions in an Ophthalmic Lens. For example, the tinting 881 may be useful in excluding or attenuating wavelengths of light as may be the function of shading ambient sunlight.

Alternatively, information may be displayed in different wavelength regimes, where an Ophthalmic Lens with appropriate filter aspects may use or exclude the information. The tinting 881 may provide safety functions where the tinting may block certain wavelengths thereby shielding or partially shielding the effect of intense radiation sources such as, for example, lasers or welding arcs. In some embodiments, the tinting 881 may address medical conditions in some users, who may benefit from either passing or rejecting certain wavelengths from entering the user's eye. Numerous filtering or band pass functions may be imparted to Ophthalmic Lenses by their inclusion into insert pieces 880, and the process of thermoforming flat sheets of material may enhance methods and process related to such embodiments.

Figure 9:
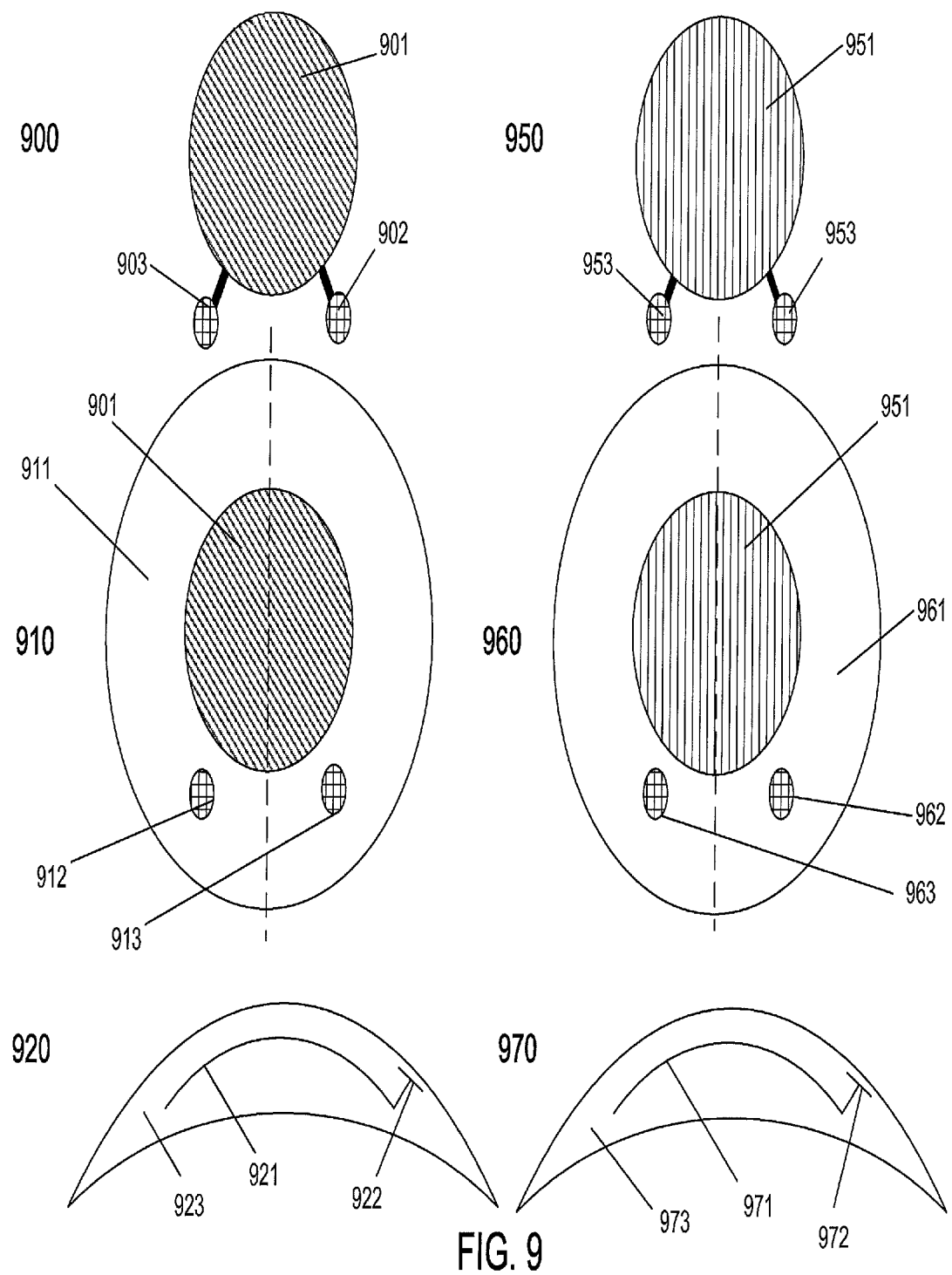
FIG. 9 illustrates an exemplary aligned differential polarization element embodiment for Ophthalmic Lenses utilizing the principle of thermoforming.

Proceeding to FIG. 9, an exemplary embodiment of a left Lens 910 and a right Lens 960 with insert pieces 900 and 950 that have been thermoformed to include polarization features 901 and 951 is illustrated. Together, the inserts may act as a set of functional Ophthalmic Lenses. Polarizing features 901 and 951 may be incorporated into insert pieces 900 and 950 in the Optic Zone. Alignment features, such as, for example, those included in the exemplary embodiments in FIG. 4, may allow for precise control of the differing polarizing orientations of the right lens 910 and the left lens 960.

For example, when the polarizing insert piece 900 and 950 is assembled into an Ophthalmic Lens 910 and 960, the insert piece 900 and 950 may be positioned with alignment features into a cavity formed between a front curve Mold and a back curve Mold. The insert piece 900 and 950 may be encapsulated by filling the area between the Mold Pieces with Reactive Monomer Mixture and then polymerizing the RMM. Numerous Reactive Monomer Mixtures may be consistent with the formation of molded Ophthalmic Devices, including, for example, those capable of forming hydrogel lenses, such as silicone hydrogel.

In some embodiments, during the molding process, the molds may include capability of forming Stabilizing Features 912, 913, 962, and 963 into the Ophthalmic Devices. These stabilization zones may be thicker regions of gelled polymer material in the regions depicted. The gelled polymer material may be added to the Molds prior to encapsulation, or, in other embodiments, may be injected into the skirt 911 and 961 after polymerization.

Alternatively, Stabilizing Features 902, 903, 952, and 953 may be thermoformed into the insert pieces 900 and 950. In some such embodiments, as seen in cross-section, the Stabilizing Features 922 and 972 may not affect the surface of the Ophthalmic Lens 920 and 970. Whereas, in other embodiments, not shown, the Stabilizing Features may affect the surface topography of the Ophthalmic Lens.

Thermoforming allows for more complex three-dimensionally formed insert pieces, as seen cross section, 921 and 971. Therefore, the insert piece 921 and 971 may be formed from a single sheet, as seen in FIG. 2, or, alternatively, the Stabilizing Features 922 and 972 may be attached after the insert piece 921 and 971 has been removed from the sheet. The attachment may utilize thermoforming techniques or any other means of attachment, such as, for example, the use of adhesives.

The extra mass and, where the Stabilizing Features alter the surface topography of the Ophthalmic Lens, the interaction of the Stabilizing Features with a user's eyelids may hold the lenses in a rotational and translational orientation relative to the user's eye. Said Stabilizing Features 912, 913, 962, and 963 may allow for Lenses 910 and 960 that have similar polarizing orientation, such as, for example, where the Lenses 910 and 960 shield the eye from reflected sunlight. Alternatively, as shown, a different orientation of the polarizing elements 901 and 951 may allow for differential communication of information to each eye, which may provide numerous functions, including Three-dimensional Perception of stereoscopic media. As with other embodiments, these types of embodiments may also include printed patterns in the portion 911 and 961 outside the Optic Zone.

Materials for Insert Based Ophthalmic Lenses

In some embodiments, a lens type can be a lens that includes a silicone containing component. A "silicone-containing component" is one that contains at least one [—Si—O—] unit in a monomer, macromer, or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, which sometimes may be called an insert encapsulating layer, that surrounds the insert may be comprised of standard hydrogel lens formulations. Exemplary materials with characteristics that may provide an acceptable match to numerous insert materials may include the Narafilcon family; including Narafilcon A and Narafilcon B. Alternatively, the Etafilcon family; including Etafilcon A may represent good exemplary material choices. A more technically inclusive discussion follows on the nature of materials consistent with the art herein; but it may be clear that any material which may form an acceptable enclosure or partial enclosure of the sealed and encapsulated inserts are consistent and included.

Suitable silicone containing components include compounds of Formula I

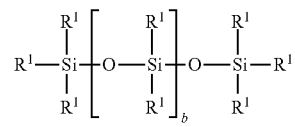

where:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a Reactive Mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

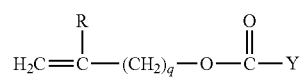

Formula II wherein: Y denotes O—, S— or NH—;
R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

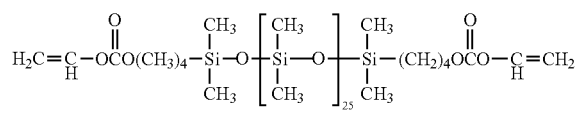

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

(*D*A*D*G)$_a$*D*D*E$^1$;

E(*D*G*D*A)$_a$*D*G*D*E$^1$ or;

E(*D*A*D*G)$_a$*D*A*D*E$^1$       Formulae IV-VI wherein:
D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;
$a$ is at least 1;
A denotes a divalent polymeric radical of formula:

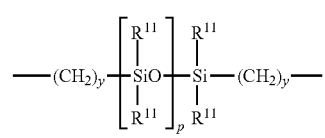

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

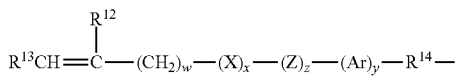

Formula VIII wherein: $R^{12}$ is hydrogen or methyl; $R^{13}$ is hydrogen, an alkyl radical having 1 to 6 carbon atoms, or a $-CO-Y-R^{15}$ radical wherein Y is $-O-$, $Y-S-$ or $-NH-$; $R^{14}$ is a divalent radical having 1 to 12 carbon atoms; X denotes $-CO-$ or $-OCO-$; Z denotes $-O-$ or $-NH-$; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX (the full structure may be understood by joining corresponding asterisk regions, * to *,  to )

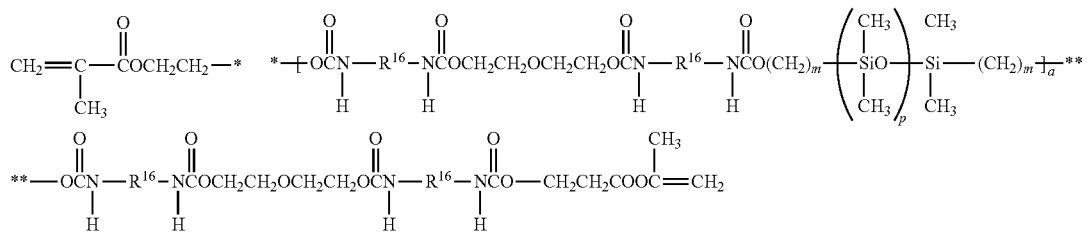

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X (the full structure may be understood by joining corresponding asterisk regions, * to *)

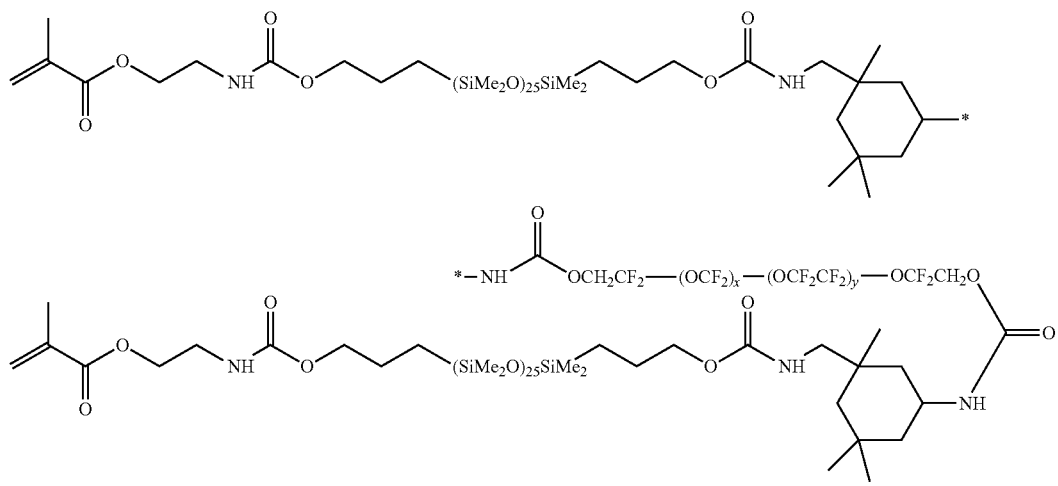

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Methods

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Figure 10:
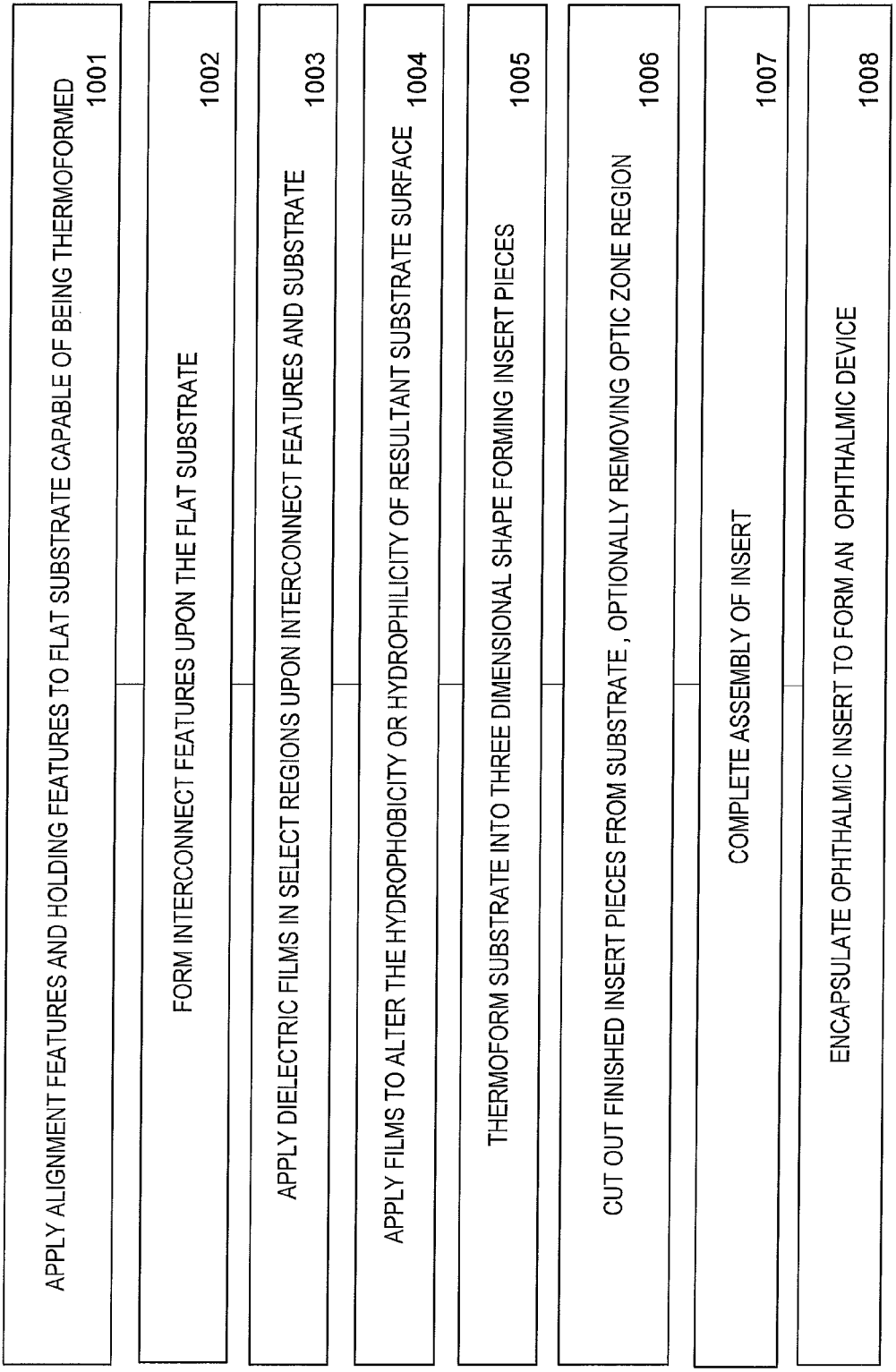
FIG. 10 illustrates a processing flow in an exemplary method to form thermoformed components and Ophthalmic Lenses incorporating them.

Referring now to FIG. 10, item 1000, a flowchart illustrates exemplary steps that may be used to implement the present invention. At 1001, a flat substrate typically in the form of a sheet of material may have alignment features imparted to it. These features may be stamped or cut out shapes made into the sheet or deformed regions as a stamp may provide without cutting material. In other embodiments, an alignment feature may be printed upon the sheet. In some embodiments, the surface or bulk of the sheet may have altered coloration by various processes including thermal treatments. The shapes may include crosses, verniers, multidirectional lines or the like, which when observed by a processing tool may allow for the unambiguous translational and rotational alignment of the piece. In addition, in some embodiments, holding features that may fixedly lock into place the substrate during processing may be formed. These features may be cut out features of various shapes that allow locating pins or components to feed through the substrate sheet in defined manners.

At 1002, in some embodiments, a Rigid Insert may include electrical traces that may be formed upon the flat substrate in defined locations relative to the alignment features. The methods of forming these interconnect features may include, for example, deposition and patterned etching; direct writing of interconnect features, such a, with laser-induced chemical vapor deposition; printing upon the substrate, such as with conductive ink printing; or pattered by the screened deposition of conductive material. In a specialized version of the processing, in some embodiments, the definition of alignment features and the placement of interconnect features may be performed simultaneously in the same processing steps.

At 1003 in some embodiments, dielectric or insulating films may be formed in selected regions. These may cover and insulate the traces in the regions of deposition. The dielectric or insulating films may be deposited in blanket fashion followed by a patterned etching process, may be printed from an insulating ink material, or may be regionally deposited by a screened deposition process.

At 1004 in some embodiments, and particularly in those embodiments that form an electro-wetting based meniscus lens active optic element, a film may be regionally applied to alter the hydrophobicity of the applied substrate and substrate features surface. The method of application may include techniques as may be utilized for steps 1002 and 1003.

At 1005, the thin sheet with any applied films may next be subjected to a thermoforming process. In many embodiments the alignment features formed in steps 1001 or 1002 may be used to align the thin film substrate with the correct location relative to a mold piece upon which the substrate may be thermoformed into a desired three dimensional shape. In some embodiments, the processing may occur for a single molding feature at a time, in others multiple thermoforming heads may be simultaneous applied to substrate material to create a number of thermoformed features.

At 1006, the thermoformed substrate may have insert pieces cut from it. The alignment features formed at step 1001 or 1002 may be useful to ensure the correct alignment of the cutting process to the various aligned features of and on the three dimensionally formed substrate piece.

The cutting process may be performed by mechanical sheering, as may occur with a sharp stamping process or other sheering process, and may introduce into the singulated or cut-out insert piece other alignment features to simultaneously register alignment even if the previous alignment features are removed from the insert piece by the cutting operation. These new alignment features may include, for example, notches, slots, rounds, and flats, or various combinations of these. The resulting insert piece may comprise the insert in cases of a single piece insert. In multi-piece Rigid Inserts, at 1007, steps at 1001-1006 may be repeated to form at least a second insert piece. In such embodiments, at 1007, the resulting insert piece may be combined with other three-dimensionally shaped features or with other insert pieces. When the insert piece is sealed, joined, or connected to the other three-dimensional insert pieces, together they may form an ophthalmic insert. In some such embodiments, the step at 1008 may utilize a thermoforming process, for example, where multiple pieces are constructed in concert or where the functional features are not susceptible to thermoforming temperatures.

At 1008, the resulting ophthalmic insert may be encapsulated by Ophthalmic Lens-forming materials to form an Ophthalmic Device. In some embodiments, the Ophthalmic Lens may be formed by placing a formed insert between two mold parts and by reacting a lens forming mixture molding the insert piece to be within the Ophthalmic Lens. The molding process may also occur in multiple steps where a thin layer of Reactive Mixture may be initially formed on a mold surface followed by the placement of the insert and fixed by reacting the Reactive Mixture. The combination of a first Ophthalmic Lens layer and the insert is then formed with additional Reactive Mixture between the molds into an Ophthalmic Lens. The various materials that have been discussed may be used alone or in combination to form an Ophthalmic Device that includes an embedded insert, which may include three-dimensional pieces that have been formed by thermoforming Although the invention may be used to provide inserts containing hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

CONCLUSION

The present invention, as described above and as further defined by the claims below, provides methods for creating single-piece or multi-piece Rigid Inserts that may be included in an Ophthalmic Lenses or may comprise the Ophthalmic Lens, wherein the Rigid Insert may be formed through the processing of thin sheet material by thermoforming. Single piece annular ophthalmic inserts may perform the function of providing a template for printed patterns to be included in Ophthalmic Lenses. Single piece full ophthalmic inserts may perform the function of polarizing light or filtering light based on the properties of materials used to form the insert. The present invention also includes apparatus for implementing such methods, as well as Ophthalmic Lenses and inserts formed with the Rigid Insert pieces that have been thermoformed.

The invention claimed is:

1. An Ophthalmic Lens with a thermoformed insert device, the Ophthalmic Lens comprising:
   a thermoformed insert device, wherein the thermoformed insert device comprises a first insert piece, wherein the first insert piece is a thermoformed material of a three-dimensional shape; and
   a hydrogel encapsulant around the thermoformed insert device;
   wherein the thermoformed insert device comprises a plurality of layers of material; and
   wherein a layer of material alters the hydrophobicity of the surface of the first insert piece.

2. An Ophthalmic Lens with a thermoformed insert device, the Ophthalmic Lens comprising:
   a thermoformed insert device, wherein the thermoformed insert device comprises a first insert piece, wherein the first insert piece is a thermoformed material of a three-dimensional shape; and
   a hydrogel encapsulant around the thermoformed insert device;
   wherein the thermoformed insert device comprises a plurality of layers of material;

wherein a polarizing layer is located between a second and third layer adjacent to a first layer and wherein the second and third layer orient the polarizing layer; and wherein the polarizing layer is aligned with respect to an alignment feature located within the body of the first insert piece.

3. An Ophthalmic Lens with a thermoformed insert device, the Ophthalmic Lens comprising:

a thermoformed insert device, wherein the thermoformed insert device comprises a first insert piece, wherein the first insert piece is a thermoformed material of a three-dimensional shape;

a hydrogel encapsulant around the thermoformed insert device; and a second insert piece, wherein the second insert piece is a thermoformed material of a three-dimensional shape, wherein a cavity is defined in a region between the first insert piece and the second insert piece.

4. The Ophthalmic Lens of claim 3, wherein the thermoformed insert device further comprises:

a first alignment feature located on the first insert piece;

a second alignment feature located on the second insert piece.

5. The Ophthalmic Lens of claim 4, wherein the first alignment feature interlocks with the second alignment feature.

6. The Ophthalmic Lens of claim 3, wherein the thermoformed insert device further comprises:

a sealing layer between the first insert piece and second insert piece that seals the first insert piece and second insert piece together along at least portions of their surfaces.

7. The Ophthalmic Lens of claim 3, wherein the thermoformed insert device further comprises:

a meniscus lens active optic element, wherein the meniscus lens active optic element is located between the first insert piece and the second insert piece.

* * * * *